United States Patent [19]
Hefter

[11] 3,765,765
[45] Oct. 16, 1973

[54] OPTICAL RANGING DEVICE
[75] Inventor: Murray Hefter, Far Rockaway, N.Y.
[73] Assignee: The United States of America as represented by the Secretary of the Navy, Washington, D.C.
[22] Filed: Dec. 27, 1971
[21] Appl. No.: 212,812

[52] U.S. Cl............................ 356/4, 356/5, 250/201, 95/44 C
[51] Int. Cl.............................................. G01c 3/08
[58] Field of Search............................ 356/4, 5, 141; 250/201; 95/44 R, 44 C

[56] References Cited
UNITED STATES PATENTS
3,499,711  3/1970  Argyle .................................... 356/5

Primary Examiner—Benjamin A. Borchelt
Assistant Examiner—S. C. Buczinski
Attorney—R. S. Sciascia et al.

[57] ABSTRACT

A thin interrupter is moved through the image plane of a converging optical system to interrupt light impinging on a pair of equal size detectors. The output signals from the detectors are used as a measure of the distance between the light source or target and the lens and the optical system.

4 Claims, 5 Drawing Figures

PATENTED OCT 16 1973     SHEET 1 OF 2     3,765,765

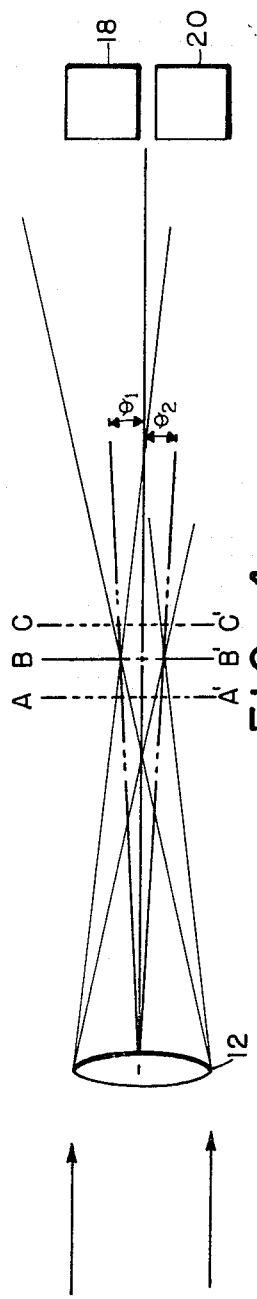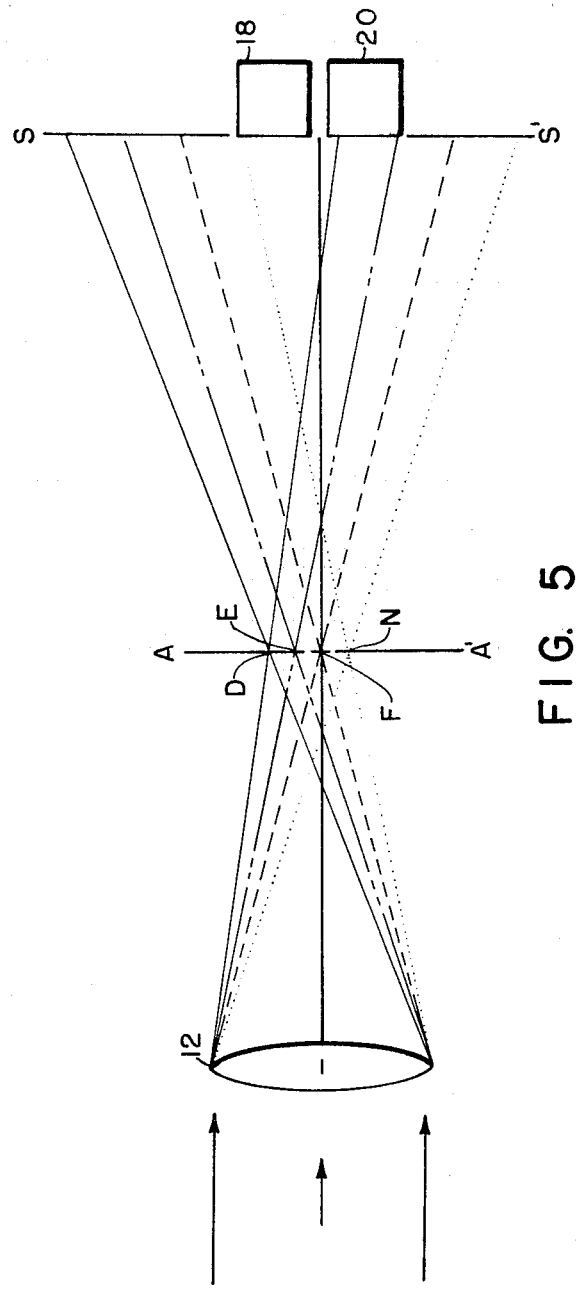

OPTICAL RANGING DEVICE

BACKGROUND OF THE INVENTION

There are various concepts and techniques which can be utilized for optically ranging. The present invention herein described is passive and requires only a single set of optics. It utilizes energy (in the visual or IR spectrum) emanating from, or being reflected by an object or target to measure the intervening distance or range.

SUMMARY OF THE INVENTION

The present invention provides an optical system for measuring range by moving a knife-edge interrupter in the focal plane to interrupt the energy emanating from a target as it impinges on dual detectors. The dual detectors produce outputs which are a function of distance between the image plane and the focal plane and this value is calibrated on an instrument to indicate range. The invention described herein provides an optical system which operates for finite sized sources (within the field of view) and point source along the optical axis or displaced from the optical axis. Also since it samples simultaneously, it can be used to measure the range of moving objects, or objects whose brightness varies.

OBJECTS OF THE INVENTION

An object of the present invention is to provide an optical ranging device that measures the position of the focal plane of an optical system in a novel manner.

Another object of the invention is the provision of an optical ranging device that measures range of an object of finite size and point sources along the optical axis or displaced from the optical axis.

A further object of the invention is the provision of an optical ranging device that measures range of moving objects, or objects whose brightness varies.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4 is a ray diagram for cases of point sources located along the image plane and displaced angularly in two opposite directions;

FIG. 5 is a ray diagram showing several superimposing light fields as might be generated by a finite target which would include several point sources.

Referring to FIG. 1 there is shown a ray diagram of a converging optical system whose light input is being radiated or reflected by an object 10 located at a distance $R$. The plane in which the light is focused (image plane) is behind the focal point 13 of the optics. The axial position of the image plane varies with the distance between the object 10 and the sensor optics 12 according to the equation:

$$1/R + 1/q = 1/f$$

Figure 1:
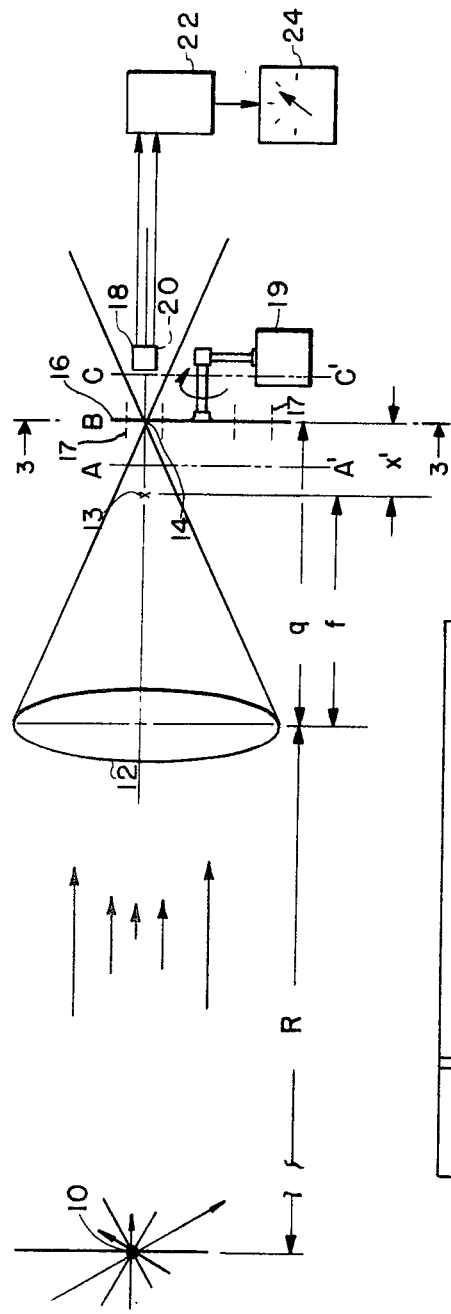
FIG. 1 is a diagrammatic illustration and side view of an embodiment of the invention.

where $R$ = the distance between object 10 and lens 12

$q$ = the distance between the image plane 14 and the lens 10.

$f$ = focal length of lens 12.

$x^1$ = the distance between the image plane 14 for the object 10 at a particular range and the infinite focal plane 13.

By solving the equation for $R$, the following equation can be obtained;

$$R = (qf/q{-}f) \approx (f^2/x^1)$$

Figure 3:
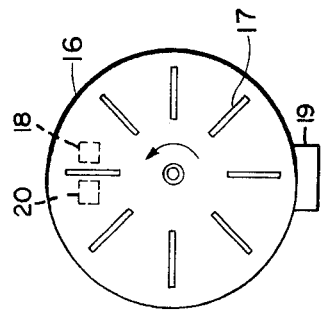
FIG. 3 is an enlarged sectional view taken along lines 3—3 of FIG. 1 to produce the waveform of FIG. 2.
Figure 2:
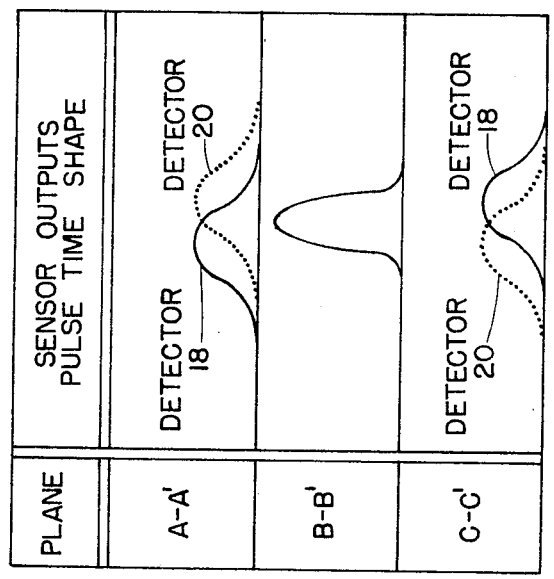
FIG. 2 is a graphical illustration of the outputs from the detectors of FIG. 1.

Since $f$ is the focal length of the optics, and is known, the position of the image plane with respect to the infinite focal plane 13 is a measure of range. A round opaque disc 16 (FIG. 3) containing radial transparent slits 17 about the circumference is positioned in the image plane of the optics. The disc 16 is spun in a plane normal to the optical axis by means of a motor 19 with the spin axis placed such that the slits 17 intercept the light field. Two equal size photoelectric detectors 18 and 20 are located in a plane normal to the optical axis and behind the image plane 14 such that they intercept the sampled energy. For the case illustrated in FIG. 1, all of the light seems to be emanating from the point image located in the image plane 14. As disc 16 is spun in the plane, B—B, the light field is intercepted and all the light coming through the point image is blocked off instantaneously. Thus the output of both detector 18 and 20 would be extinguished in an identical manner and time. When the image plane moves, as for example, A—A', the interrupter disc 16 would intercept the light falling on detector 18 before it would intercept the light falling on detector 20. FIG. 2 shows waveforms of the respective outputs from sensors 18 and 20 when the image plane is in positions A–A', B–B', and C–C', respectively. The phase difference of the outputs of detectors 18 and 20 is a function of the distance $x^1$ (FIG. 1) and is detected in phase discriminator 22 and fed to a range meter 24.

In order to calibrate the instrument, disc 16 is positioned at a known focal image plane for a known distance $R$. As a target moves with respect to the lens 12, the image plane will move and then cause an output from discriminator 22 which is a function of the distance moved. When used as a target detector, only targets within the range of interest would be detected.

FIG. 4 depicts ray diagrams for cases of point sources located along the image plane, and displaced angularly in two opposite directions shown by $\theta_1$ and $\theta_2$. In either case the images appear (to sensors 18 and 20) to be point-radiating sources located in the image plane B–B$^1$ and will produce output waveforms as shown in FIG. 2.

A finite target can be considered to be made up of an infinite number of points source targets located next to each other. FIG. 5 is a ray diagram showing several superimposing light fields as might be generated by several point targets at the same range but not necessarily of the same intensity. Image F is located along the optical axis, whereas images D, E, and N are angularly displaced by differing amounts off the optical axis.

All the images look like point radiating sources located in plane A–A' to sensors 18 and 20 located in a plane S–S$^1$. The composite signal generated by the multiplicity of point sources would cause composite signals to be generated in detectors 18 and 20 which are of the same time-phase and of identical shape. As the focal plane shifts, the output of discriminator 22 will be proportional to range as described above. The placement of detectors 18 and 20 should always be where all light fields overlap. Relay optics can be used between the image plane A–A' and detectors 20 and 18 for utilizing smaller detectors, changing the spacing between the image plane A–A' and detectors 18 and 20 or varying the field of view.

Obviously many modifications and variations of the present invention are possible in the light of the above teachings. It is therefore to be understood that within the scope of the appended claims the invention may be practiced otherwise than as specifically described.

What is claimed is:

1. A stationary optical system for determining the range to an object said optical system comprising:
   a. a stationary lens for focusing the rays of energy from the object to an image plane, said lens having an optical axis and a focal length,
   b. interrupter means positioned with respect to said image plane and said optical axis for sequentially interrupting the focused rays of energy,
   c. first and second detectors positioned with respect to said image plane and said optical axis to simultaneously intercept the focused rays of energy emitted by said stationary lens when the image plane and the plane in which said interrupter means is positioned coincide and to sequentially intercept the focused rays of energy when the image plane and the plane in which said interrupter means is positioned do not coincide, each detector having an output proportional to the time that the ray energy is intercepted.

2. The optical system of claim 1 wherein interruption of said focused rays of energy is by means of a knife-edge interrupter.

3. The optical system of claim 1 wherein said interrupter means is a thin opaque disc containing a plurality of radial transparent slits.

4. The optical system of claim 3 wherein said first and second detectors are of equal size.

* * * * *